United States Patent [19]

DeFrank et al.

[11] Patent Number: 5,722,601
[45] Date of Patent: Mar. 3, 1998

[54] DRIP IRRIGATION HOSE AND METHOD OF ITS MANUFACTURE

[75] Inventors: Michael DeFrank, Temecula; Wayne Hackman; Shawn Shirvan, both of San Diego, all of Calif.

[73] Assignee: T-Systems International, Inc., San Diego, Calif.

[21] Appl. No.: 683,604

[22] Filed: Jul. 15, 1996

Related U.S. Application Data

[63] Continuation-in-part of Ser. No. 346,335, Nov. 29, 1994, abandoned, which is a continuation-in-part of Ser. No. 249,904, May 26, 1994, abandoned.

[51] Int. Cl.⁶ ..................................................... B05B 15/00
[52] U.S. Cl. ............................ 239/542; 239/562; 239/566
[58] Field of Search .................................... 239/542, 562, 239/566, 450

[56] References Cited

U.S. PATENT DOCUMENTS

| | | | |
|---|---|---|---|
| 4,354,639 | 10/1982 | Delmer | 239/542 |
| 4,473,191 | 9/1984 | Chapin | 239/542 |
| 5,106,021 | 4/1992 | Gilead | 239/542 X |
| 5,123,984 | 6/1992 | Allport et al. | 239/542 X |
| 5,282,578 | 2/1994 | De Frank | 239/542 |

*Primary Examiner*—Andres Kashnikow
*Assistant Examiner*—Lisa Ann Douglas
*Attorney, Agent, or Firm*—Christie, Parker & Hale, LLP

[57] ABSTRACT

The serpentine, turbulence inducing path lengths from the inlets to the outlets of the flow regulating passage of a continuous emitter drip irrigation hose are arranged in back to back fashion relative to the outlets in the sense that the chevrons angle away from each of outlets, so there is parallel turbulent flow from two inlets to each outlet. This doubles the flow rate from each outlet without changing the dimensions of the flow regulating passage.

11 Claims, 3 Drawing Sheets

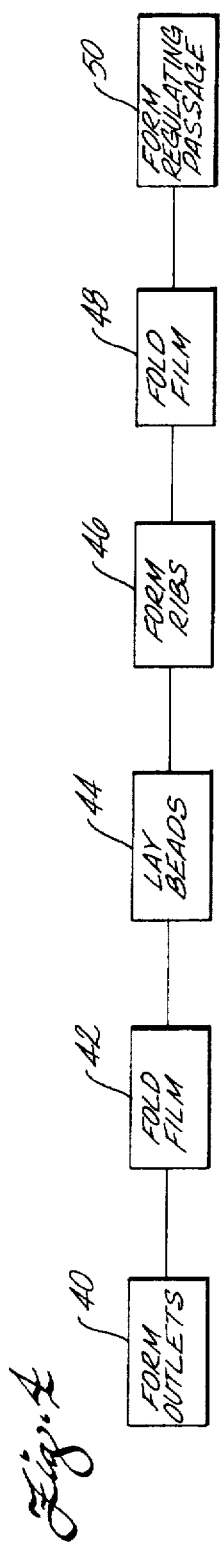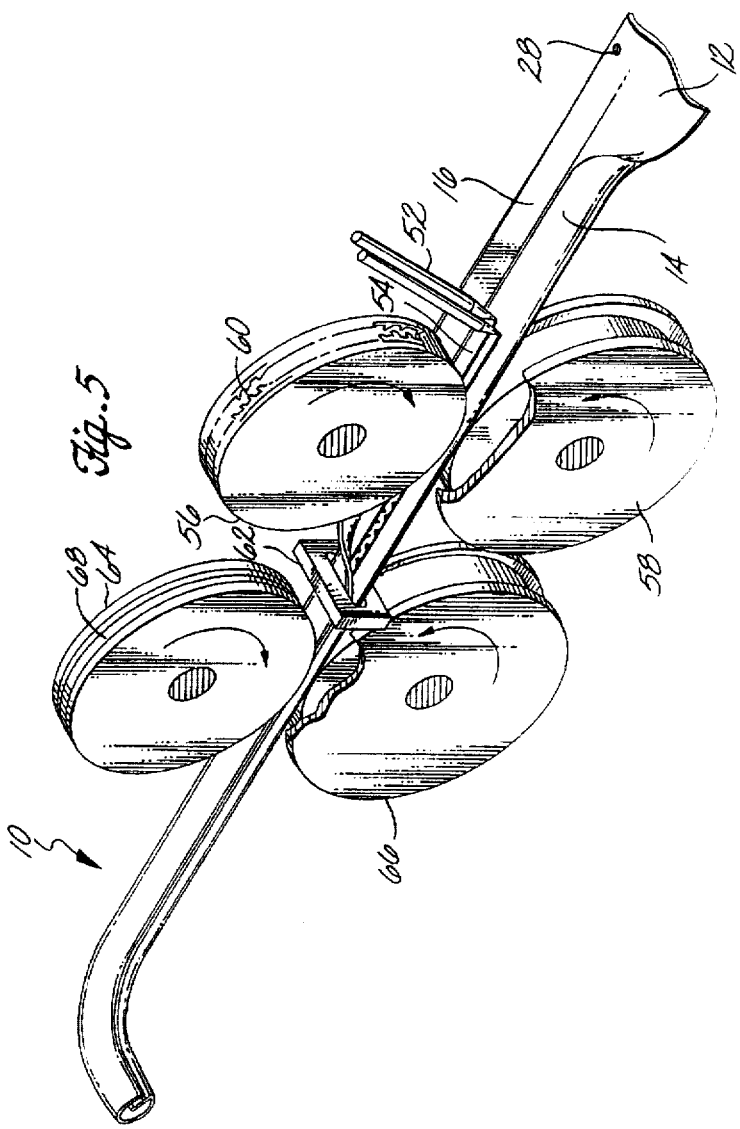

DRIP IRRIGATION HOSE AND METHOD OF ITS MANUFACTURE

CROSS-REFERENCE TO RELATED APPLICATION

This is a continuation-in-part of application Ser. No. 08/346,335, filed Nov. 29, 1994, now abandoned, which in turn is a continuation-in-part of application Ser. No. 08/249,904, filed May 26, 1994, now abandoned.

FIELD OF THE INVENTION

This invention relates to the field of drip irrigation and, more particularly, to a turbulent, high flow drip irrigation hose and method for its manufacture.

BACKGROUND OF THE INVENTION

Drip irrigation hose can be classified as having either discrete emitters or continuous integral emitters. An example of discrete emitters is shown in U.S. Pat. No. 4,850,531. An example of continuous integral emitters is shown in U.S. Pat. No. 4,247,051.

A design objective of drip irrigation hose is uniformity of the drip rate from each emitter. Since the water pressure in a drip irrigation system varies as a function of elevation of the field, it is customary to incorporate a pressure regulating mechanism into the emitters. Turbulent flow is less sensitive to pressure variation than laminar flow. Accordingly, it has become common practice for drip irrigation hose to employ a serpentine flow regulating passage as continuous integral emitters to promote turbulent flow. An example of such drip irrigation hose is disclosed in U.S. Pat. No. 4,984,739, where a series of staggered, upstream angled chevrons or weirs form the serpentine passage.

In a typical drip irrigation hose with continuous integral turbulent flow emitters, the emitters comprise a flow regulating passage formed by ribs that also seal the overlapping margins of an elongated bent sheet of plastic film. The passage is divided by cross ribs to form flow regulating segments. The bent film forms an elongated water supply passage having a large diameter. An inlet is formed from the water supply passage to one end of each segment of the flow regulating passage. An outlet is formed from the other end of each segment of the flow regulating passage to the exterior of the hose. Between the inlet and outlet, each segment has staggered, upstream angled chevrons.

Complications can occur when the dimensions of this type of drip irrigation hose are changed to increase the flow rate. Generally, the flow rate can be increased by decreasing the length of the segments, increasing the height of the ribs, or increasing the separation between the ribs of the flow regulating passage. However, these measures tend to decrease the reliability and uniformity of the product and to cause the water to squirt out of the outlets because the line pressure is not fully dissipated by the flow regulating passage.

SUMMARY OF THE INVENTION

According to the invention, the serpentine, turbulence inducing path lengths from the inlets to the outlets of the flow regulating passage of a continuous emitter drip irrigation hose are arranged in back to back fashion, so there is parallel turbulent flow from two inlets to each outlet. This doubles the flow rate from each outlet without changing the dimensions of the flow regulating passage. In other words, the flow rate from each outlet is twice the flow rate of a single path from inlet to outlet. Specifically, a longitudinal flow regulating passage having a small cross section is disposed along a elongated water supply passage having a large cross section. There are plurality of longitudinally spaced inlets from the water supply passage to the flow regulating passage and a plurality of longitudinally spaced outlets from the flow regulating passage to the exterior of the hose. The outlets are offset from the inlets to provide two substantial path lengths from each inlet to a respective outlet. A series of staggered chevrons are formed along the sides of the flow regulating passage. The chevrons are angled towards the inlets along each path length to induce turbulent flow. Specifically, a longitudinal flow regulating passage having a small cross section is disposed along a elongated water supply passage having a large cross section. There are plurality of longitudinally spaced inlets from the water supply passage to the flow regulating passage and a plurality of longitudinally spaced outlets from the flow regulating passage to the exterior of the hose. The outlets are offset from the inlets to provide two substantial path lengths from each inlet to a respective outlet. A series of staggered chevrons are formed along the sides of the flow regulating passage. The chevrons are angled towards the inlets along each path length to induce turbulent flow.

BRIEF DESCRIPTION OF THE DRAWINGS

The features of specific embodiments of the best mode contemplated of carrying out the invention are illustrated in the drawings, in which:

FIG. 4 is a schematic block diagram of the method for manufacturing the drip irrigation hose shown in FIG. 1; and FIG. 5 is a perspective view of apparatus for performing the bead laying, rib forming, film folding, and regulating passage forming steps of FIG. 4.

DETAILED DESCRIPTION OF THE SPECIFIC EMBODIMENT

The disclosures of U.S. Pat. Nos. 4,247,051 4,984,739 and 5,123,984 are incorporated fully herein by reference.

Figure 1:
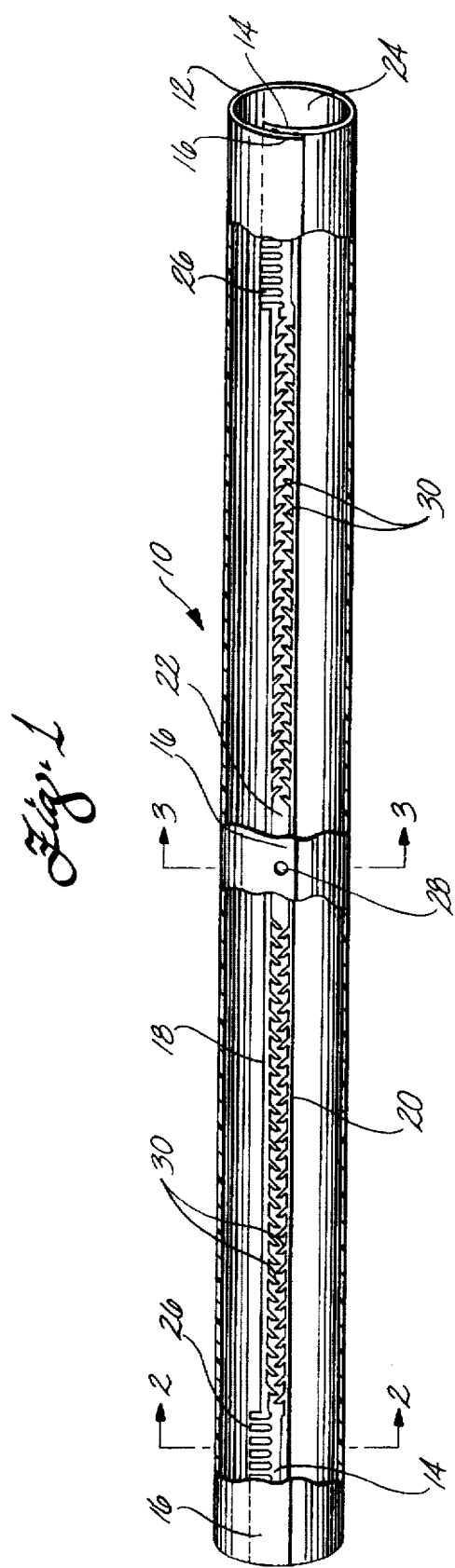
FIG. 1 is a top plan view of a drip irrigation hose incorporating the principles of the invention with the outer margin partially cut away.
Figure 2:
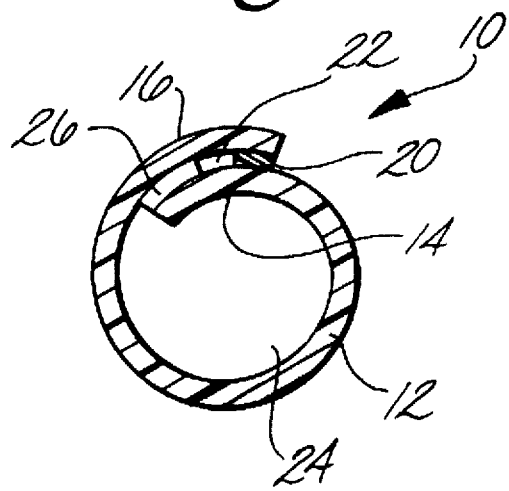
FIG. 2 is a sectional view taken through plane 2—2 in FIG. 1 illustrating two inlets to the flow regulating passage.
Figure 3:
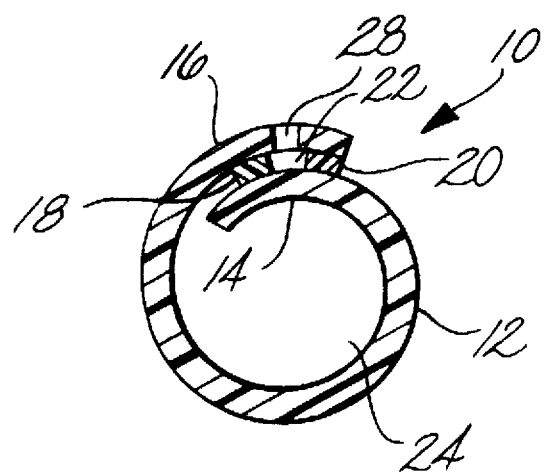
FIG. 3 is a sectional view taken through plane 3—3 in FIG. 1 illustrating an outlet from the flow regulating passage.

As illustrated in FIGS. 1, 2 and 3, a drip irrigation hose 10 is formed from a thin (e.g., 4 to 15 mil) film 12 of flexible water impervious plastic material bent along its length to form an overlapping longitudinal seam between opposing longitudinal margins, namely an inner margin 14 and an outer margin 16. Margins 14 and 16 are sealed together by a continuous repeating pattern of longitudinally extending spaced apart ribs 18 and 20 made of the same or compatible plastic material as film 12. Ribs 18 and 20 and margins 14 and 16 define a flow regulating passage 22 as described in more detail in the referenced '051 and '739 patents. A water supply passage 24 is defined by the remainder of film 12. At spaced intervals, rib 18 has a series of interruptions and pillars that form inlets 26 to flow regulating passage 22. Midway between each pair of inlets 26, an outlet 28 is formed by one or more holes in outer margin 16. A series of staggered chevrons 30 are formed along the inner sides of ribs 18 and 20 between each of inlets 26 and outlets 28. In each case, the chevrons are angled toward inlets 26 to promote turbulent flow along the path length from each inlet 26 to outlet 28 of flow regulating passage 22. As illustrated in FIG. 1, inlets 26 have a substantially larger cross sectional area than outlets 28 and the flow regulating passages. As a result, inlets 26 are not flow limiting. Thus, the serpentine turbulence inducing path lengths are arranged in back to back fashion relative to the outlets in the sense that the chevrons angle away from each of outlets 28, so there is parallel flow throughout the length of hose 10 from two of inlets 26 to one of outlets 28. The pattern of ribs illustrated in FIG. 1 is repeated continuously along the entire length of hose 10 between overlapping margins 14 and 16. As a result, outlets 28 are spaced from each other and offset from inlets 26, which are also spaced from each other. Since inlets 26 are not flow limiting, of inlets 26 feeds two of outlets 28 and each of outlets 28 is fed by two of inlets 26. As a result, the flow rate through each outlet 28 is doubled because it is fed by two inlets and two flow regulating passages.

In summary, as described above, since the pattern of ribs shown in FIG. 1 is repeated continuously along the entire length of hose, each of inlets 26 feeds two outlets 28. In other words, the inlet 26 shown on the left side of FIG. 1 feeds the outlet 28 shown in FIG. 1 and the adjacent outlet 28 of the pattern to the left of what is shown in FIG. 1 and the inlet 26 shown on the right side of FIG. 1 feeds the outlet 28 shown in FIG. 1 and the adjacent outlet 28 of the pattern to the right of what is shown in FIG. 1. However, the water flow from each inlet 26 through the flow regulating passages 22 is not cut in half or substantially reduced, because inlets 26 are not flow limiting. To the contrary, the flow rate is substantially doubled without changing the dimensions, as compared to the case where the inlets are flow limiting or the case where one inlet feeds one outlet.

In operation when hose 10 is pressurized in the field, water flows through supply passage 24 to inlets 26, passes from inlets 26 through flow regulating passage 22 to outlets 28, and exits from outlets 28 to the exterior of hose 10. Two back to back path lengths are formed from adjacent pairs of inlets 26 to each outlet 28, thereby doubling the flow rate for the dimensions of the flow regulating passage, i.e., path length, rib height and rib spacing, vis-a-vis the drip irrigation hose disclosed in the '739 patent. It should be noted that cross ribs dividing the flow regulating passage into segments as disclosed in the '739 patent are not required in the practice of the invention. Such cross ribs could be provided, however, if desired at inlets 26 (or outlets 28), effectively dividing each inlet 26 (or outlet 28) into two inlets (or outlets), one for each adjacent segment of the flow regulating passage.

The method for making the described drip irrigation hose is illustrated in FIGS. 4 and 5. As represented in FIG. 4 by a block 40, outlets 28 are first formed in film 12 in the manner disclosed in the '984 patent or U.S. Pat. No. 5,522,551, which issued on Jun. 4, 1996, the disclosure of which is incorporated fully herein by reference. Then, as represented by a block 42 inner margin 14 is folded. As represented by a block 44, one or more beads are laid on the outside surface of inner margin 14 by one or more extrusion nozzles. As represented by a block 46, a pattern of ribs, i.e., ribs 18 and 20, is formed by a molding wheel. As represented by a block 48, outer margin 16 is next folded onto inner margin 14 with the formed ribs therebetween. Finally, as represented by a block 50, flow regulating passage 22 is finished by passing inner margin 14, outer margin 16, and the ribs 18 and 20 through the nip of a form wheel and a backing wheel to set precisely the height of ribs 18 and 20. This method is described in more detail in the '984 patent.

FIG. 5 illustrates apparatus for performing the steps represented by blocks 44 to 50. One or more extrusion nozzles 52 deposit one or more continuous longitudinal beads 54 on the outside surface of inner margin 14. Film 12 then passes through the nip of a rotating molding wheel 56 and a rotating backing wheel 58. Molding wheel 56 has a pattern of depressions 60 corresponding to the desired rib pattern on drip irrigation hose 10, i.e., the pattern shown in FIG. 1. In the nip of wheels 56 and 58, beads 54 are shaped by molding wheel 56 to form the desired bead pattern repeatedly and continuously on film 12 for the entire length of hose 10. Thereafter, external margin 16 of film 12 is folded by a guide 62 to overlap inner margin 14. As a final step, the overlapped margins of film 12 pass through the nip of a form wheel 64 and a backing wheel 66. Form wheel 64 has a groove 68 that depresses the ribs formed by beads 54 to set the rib height at a specified value that determines the flow rate of the hose. During the described process, film 12 is continuously transported by conventional means not shown. For example, the disclosed wheels could be driven or other drive wheels could be provided to transport the film.

The described embodiment of the invention is only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A drip irrigation hose made from a water impervious material comprising:

an elongated water supply passage having a large cross section;

a longitudinal flow regulating passage having a small cross section, the flow regulating passage being disposed along the water supply passage;

a plurality of longitudinally spaced non flow limiting inlets from the water supply passage to the flow regulating passage;

a plurality of longitudinally spaced outlets from the flow regulating passage to the exterior of the hose, the outlets being offset from the inlets to provide two substantial path lengths from each inlet to a respective outlet; and a series of staggered chevrons formed along the flow regulating passage, the chevrons being angled toward the inlets along each path length to induce turbulent flow.

2. The hose of claim 1, in which the water supply passage comprises an elongated strip of plastic film folded lengthwise to form an overlapping seam from opposing outer and inner margins of the film and a seal between the margins in the overlapping seam.

3. The hose of claim 2, in which the flow regulating passage comprises a continuous repetitive pattern of plastic ribs extending between the margins in the overlapping seam to form the seal.

4. The hose of claim 3, in which the pattern of ribs includes a longitudinal rib facing the water supply passage and the inlets each comprise one or more interruptions in the rib.

5. The hose of claim 4, in which the outlets each comprise one or more holes in the outer margin.

6. The hose of claim 3, in which the pattern of ribs includes first and second parallel longitudinal ribs having inner sides that face each other, the chevrons being formed along the ribs.

7. A drip irrigation hose made from a water impervious material comprising:

- an elongated water supply passage having a large cross section;
- a longitudinal flow regulating passage having a small cross section, the flow regulating passage being disposed along the water supply passage;
- a plurality of longitudinally spaced inlets from the water supply passage to the flow regulating passage;
- a plurality of longitudinally spaced outlets from the flow regulating passage to the exterior of the hose, the outlets being offset from the inlets to provide two substantial path lengths from each inlet to a respective outlet; and
- the inlets having a substantially larger cross sectional area than the outlets and the flow regulating passages such that each outlet is fed by two inlets and two flow regulating passages.

8. The hose of claim 7, in which the flow regulating passage comprises a continuous repetitive pattern of plastic ribs extending between the margins in the overlapping seam to form the seal.

9. The hose of claim 8, in which the pattern of ribs includes a longitudinal rib facing the water supply passage and the inlets are each formed by a plurality of interruptions in the rib, leaving between the interruptions pillars.

10. The hose of claim 9, in which each inlet feeds two outlets.

11. The hose of claim 7, in which each inlet feeds two outlets.

* * * * *